(12) United States Patent
Ejiri

(10) Patent No.: US 9,644,061 B2
(45) Date of Patent: May 9, 2017

(54) ETHYLENE POLYMER PELLET AND EXTRUSION PROCESS USING THE SAME

(75) Inventor: Susumu Ejiri, Chiba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 552 days.

(21) Appl. No.: 13/583,134

(22) PCT Filed: Mar. 7, 2011

(86) PCT No.: PCT/JP2011/055860
§ 371 (c)(1),
(2), (4) Date: Sep. 6, 2012

(87) PCT Pub. No.: WO2011/111846
PCT Pub. Date: Sep. 15, 2011

(65) Prior Publication Data
US 2013/0001823 A1    Jan. 3, 2013

(30) Foreign Application Priority Data

Mar. 8, 2010  (JP) ................. 2010-050295

(51) Int. Cl.
| | | |
|---|---|---|
| *C08F 255/02* | (2006.01) | |
| *B29C 47/00* | (2006.01) | |
| *C08L 23/04* | (2006.01) | |
| *B29C 47/10* | (2006.01) | |
| *B29K 23/00* | (2006.01) | |
| *B29K 105/00* | (2006.01) | |
| *C08K 5/14* | (2006.01) | |
| *C08K 5/5425* | (2006.01) | |

(52) U.S. Cl.
CPC ........ *C08F 255/02* (2013.01); *B29C 47/0021* (2013.01); *C08L 23/04* (2013.01); *B29C 47/0004* (2013.01); *B29C 47/1036* (2013.01); *B29C 47/1063* (2013.01); *B29K 2023/00* (2013.01); *B29K 2023/06* (2013.01); *B29K 2105/0005* (2013.01); *C08K 5/14* (2013.01); *C08K 5/5425* (2013.01); *Y10T 428/2982* (2015.01)

(58) Field of Classification Search
CPC ........ B29K 2105/0088; B29K 2023/00; B29K 2023/06; B29K 2105/0005; B29C 47/0004; B29C 47/0021; B29C 47/1036; B29C 47/1063; C08K 5/5425; C08F 255/02; C08F 230/08; C08L 23/04; C08L 2666/02; Y10T 428/2982
USPC ................. 264/5–6, 211; 428/402
See application file for complete search history.

(56) References Cited

U.S. PATENT DOCUMENTS

| | | | |
|---|---|---|---|
| 3,646,155 A * | 2/1972 | Scott .............................. | 525/288 |
| 3,931,130 A * | 1/1976 | Beining ........................ | 528/500 |
| 4,228,255 A * | 10/1980 | Fujimoto et al. ............. | 525/288 |
| 5,741,848 A * | 4/1998 | Nogata et al. ................ | 524/587 |
| 6,830,777 B2 * | 12/2004 | Danekas et al. .............. | 427/117 |

FOREIGN PATENT DOCUMENTS

| | | |
|---|---|---|
| JP | H07-130238 A | 5/1995 |
| JP | H08-134147 A | 5/1996 |
| JP | 2002-97324 A | 4/2002 |
| JP | 2006-182941 A | 7/2006 |
| JP | 2007-291364 A | 11/2007 |
| JP | 2008-238532 A | 10/2008 |
| JP | 2009-142533 A | 7/2009 |

OTHER PUBLICATIONS

M. Narkis, A. Tzur and A. Vaxman, Polymer Engineering and Science, Sep. 1985, vol. 25, No. 13.*
Kenxo Chikanaari and Tatsuhiro Nagamatsu,R&D Report, "Sumitomo Kagaku",vol. 2006-II.*
International Search Report dated Apr. 5, 2011, corresponding to International Application PCT/JP2011/055860.

* cited by examiner

*Primary Examiner* — Larry Thrower
(74) *Attorney, Agent, or Firm* — Fitch, Even, Tabin & Flannery, LLP

(57) ABSTRACT

Provided is a pellet of an ethylene polymer having a kneading torque at 160° C. of 2 to 15 Nm, wherein the pellet has a specific surface area of 1,800 to 3,000 mm$^2$/g.

21 Claims, No Drawings

ETHYLENE POLYMER PELLET AND EXTRUSION PROCESS USING THE SAME

CROSS-REFERENCE TO RELATED APPLICATIONS

This is a U.S. National Phase of International Application PCT/JP2011/055860, filed Mar. 7, 2011, and claims the benefit of foreign priority from Japanese Patent Application 2010-050295, filed Mar. 8, 2010, the entire disclosures of which applications are hereby incorporated herein by reference.

TECHNICAL FIELD

The present invention relates to an ethylene-based polymer pellet and to an extrusion process that uses the ethylene-based polymer pellet and a liquid.

BACKGROUND ART

Ethylene-based polymers, such as high-pressure radical polymerization process polyethylene, linear low density polyethylene, and high density polyethylene, have been processed by various extrusion processes into various types of molded articles, such as films, sheets, hollow containers, pipes, tubes, resin-coated electric wires, resin-coated steel materials, and foamed articles.

In extrusion of ethylene-based polymers, various additives are usually used together according to the intended application. When such an additive is a liquid, there is known a method in which an ethylene-based polymer is kneaded in an extruder and the liquid additive is added with a pump or a feeder during the kneading. However, such a method needs specially-designed equipment, such as pump or feeder, for adding a liquid additive. In the case that the additive is caused to react with a resin, the length of an extruder and the position where the additive can be added are restricted.

Although a method in which both a liquid additive and an ethylene-based polymer are fed into a hopper and kneaded in an extruder has also been known, in the case that a conventional pellet is used as an ethylene-α-olefin copolymer and kneaded in a single-screw extruder, extrusion may be unstable due to slipping of the wet pellet. As a measure for this, a method using an ethylene-α-olefin copolymer in a form other than pellet is investigated. Patent document 1 has disclosed a method of producing an electric wire and cable extruded using a granular linear low density polyethylene and a linear low density polyethylene pellet. Patent document 2 has disclosed a method of obtaining a water-crosslinked molded article using a granular linear low density ethylene-α-olefin copolymer.
Patent document 1: JP 7-130238 A
Patent document 2: JP 8-134147 A In both patent documents 1 and 2, an ethylene-α-olefin copolymer in a shape other than pellet is used, and there is not known any method in which extrusion process is stably conducted by using a single-screw extruder using a pellet, which has been used widely in the form of ethylene-based polymers, and a liquid.

Under such a situation, one problem to be solved by the present invention is to provide an extruded article that is made of a highly-crosslinked ethylene-based polymer and that is extruded stably with a single-screw extruder under direct addition of a liquid to a pellet without addition such a liquid to a molten resin by using a feeder, a pump, or the like. Another problem is to provide a method of conducting extrusion process by the use of a single-screw extruder using that pellet and adding a liquid additive.

DISCLOSURE OF THE INVENTION

The first of the present invention is a pellet of an ethylene-based polymer, wherein the ethylene-based polymer exhibits a kneading torque (unit: Nm, this may be hereinafter referred to as B torque) of 2 to 15 Nm at 160° C. and the pellet has a specific surface area of 1800 to 3000 mm$^2$/g.

The second of the present invention relates to the above-mentioned pellet whose EP index calculated by the following method is 0.1 to 1:

EP index=($MT$190)/($B$ torque)

wherein MT 190 (unit: cN) is a melt tension at 190° C., and
B torque (unit: Nm) is a kneading torque at 160° C.

The third of the present invention is a process comprising feeding the above-mentioned pellet and a liquid into a hopper, kneading them in a single screw extruder, and extruding them through a die.

MODE FOR CARRYING OUT THE INVENTION

As to the ethylene-based polymer to be used for the present invention, the content of monomer units based on ethylene in the ethylene-based polymer is usually 50 to 100% by weight where the overall weight of the ethylene-based polymer is considered to be 100% by weight. The content of monomer units based on copolymerized monomers other than ethylene is usually 0 to 50% by weight where the overall weight of the ethylene-based polymer is considered to be 100% by weight.

Examples of the copolymerized monomers to be used for the ethylene-based polymer of the present invention include α-olefins, vinyl acetate, acrylic acid, acrylic esters, methacrylic acid, methacrylic esters, styrene, α-methylstyrene, vinylcyclohexane, conjugated dienes, and nonconjugated dienes. These may be used singly or two or more of them may be used in combination.

Examples of the ethylene-based polymer to be used for the present invention include ethylene homopolymers, ethylene-α-olefin copolymers, ethylene-vinyl acetate copolymers, ethylene-acrylic acid copolymers, ethylene-acrylic ester copolymers, ethylene-methacrylic acid copolymers, ethylene-methacrylic ester copolymers, ethylene-conjugated diene copolymers, and ethylene-nonconjugated diene copolymers.

As the α-olefin as the copolymerized monomers to be used for the polymer of the present invention, α-olefins having 3 to 20 carbon atoms are preferred, and examples of such α-olefins include propylene, 1-butene, 1-pentene, 1-hexene, 1-heptene, 1-octene, 1-nonene, 1-decene, 1-dodecene, 4-methyl-1-pentene, and 4-methyl-1-hexene. Preferred α-olefins are 1-butene, 1-hexene, 4-methyl-1-pentene, and 1-octene.

As the acrylic esters as the copolymerized monomers to be used for the polymer of the present invention, esters of acrylic acid with alcohols having 1 to 20 carbon atoms are preferred, and examples of such acrylic esters include methyl acrylate, ethyl acrylate, butyl acrylate, pentyl acrylate, hexyl acrylate, heptyl acrylate, octyl acrylate, stearyl acrylate, and glycidyl acrylate. Methyl acrylate, ethyl acrylate, stearyl acrylate, and glycidyl acrylate are preferred.

As the methacrylic esters as the copolymerized monomers to be used for the polymer of the present invention, esters of methacrylic acid with alcohols having 1 to 20 carbon atoms are preferred, and examples of such methacrylic esters include methyl methacrylate, ethyl methacrylate, butyl methacrylate, pentyl methacrylate, hexyl methacrylate, heptyl methacrylate, octyl methacrylate, stearyl methacrylate, and glycidyl methacrylate. Methyl methacrylate, ethyl methacrylate, stearyl methacrylate, and glycidyl methacrylate are preferred. Methyl methacrylate is more preferred.

Examples of the conjugated diene as a copolymerized monomer to be used for the polymer of the present invention include butadiene and isoprene.

As the nonconjugated diene as a copolymerized monomer to be used for the polymer of the present invention, $\alpha,\omega$-alkadienes having 5 to 10 carbon atoms are preferred, and examples thereof include 1,4-pentadiene, 1,5-hexadiene, 1,6-heptadiene, 1,7-octadiene, and 1,8-nonadiene.

As the ethylene-based polymer to be used for the present invention, ethylene homopolymers, ethylene-$\alpha$-olefin copolymers, and ethylene-vinyl acetate copolymers are preferred, ethylene-$\alpha$-olefin copolymers and ethylene-vinyl acetate copolymers are more preferred, and ethylene-$\alpha$-olefin copolymers are even more preferred.

Examples of the ethylene-$\alpha$-olefin copolymers to be used for the present invention include ethylene-1-butene copolymers, ethylene-1-hexene copolymers, ethylene-4-methyl-1-pentene copolymers, ethylene-1-octene copolymers, ethylene-1-butene-1-hexene copolymers ethylene-1-butene-4-methyl-1-pentene copolymers, ethylene-1-butene-1-octene copolymers, and ethylene-1-hexene-1-octene copolymers; ethylene-1-hexene copolymers, ethylene-4-methyl-1-pentene copolymers, ethylene-1-butene-1-hexene copolymers, ethylene-1-butene-1-octene copolymers, and ethylene-1-hexene-1-octene copolymers are preferred.

The density (this may hereinafter be referred to as "$d_A$") of the ethylene homopolymer and the ethylene-$\alpha$-olefin copolymer to be used for the present invention is usually 860 to 990 kg/m$^3$.

From the viewpoint of enhancing liquid retainability, it is preferably not more than 950 kg/m$^3$, more preferably not more than 930 kg/m$^3$; from the viewpoint of inhibiting pellets from attaching to each other, it is preferably not less than 890 kg/m$^3$, more preferably not less than 910 kg/m$^3$. The density is measured in accordance with Method A provided in JIS K7112-1980 after doing the annealing disclosed in JIS K6760-1995.

The density of an ethylene homopolymer can be adjusted by altering a polymerization temperature or a chain transfer agent. For example, the density can be reduced by increasing the polymerization temperature.

The density of an ethylene-$\alpha$-olefin copolymer can be adjusted by altering the polymerization proportions of ethylene and the $\alpha$-olefin. The density can be increased by reducing the polymerization proportion of the $\alpha$-olefin.

The density of copolymers other than the ethylene homopolymer and the ethylene-$\alpha$-olefin copolymer to be used for the present invention, namely, the density (this may hereinafter referred to as "$d_B$") of ethylene-vinyl acetate copolymers, ethylene-acrylic acid copolymers, ethylene-acrylic ester copolymers, ethylene-methacrylic acid copolymers, ethylene-methacrylic esters, ethylene-conjugated diene copolymers, and ethylene-nonconjugated diene copolymers is usually 920 to 990 kg/m$^3$.

From the viewpoint of enhancing liquid retainability, it is preferably not less than 930 kg/m$^3$, more preferably not less than 940 kg/m$^3$. From the viewpoint of inhibiting pellets from attaching to each other, it is preferably not more than 970 kg/m$^3$, more preferably not more than 960 kg/m$^3$.

The density is measured in accordance with the method provided in Method A of JIS K7112-1980.

The density of an ethylene-vinyl acetate copolymer, an ethylene-acrylic acid copolymer, an ethylene-acrylic ester copolymer, an ethylene-methacrylic acid copolymer, and an ethylene-methacrylic ester can be adjusted by altering the polymerization proportions of ethylene and a monomer to be copolymerized. The density can be increased by increasing the polymerization proportion of a monomer to be copolymerized.

The melt flow rate (this may hereinafter be referred to as "MFR") of the ethylene-based polymer to be used for the present invention is usually 0.01 (g/10 min) to 100 (g/10 min). From the viewpoint of reducing the extrusion load at the time of molding, the melt flow rate is preferably not less than 0.05 g/10 min, more preferably not less than 0.1 g/10 min. From the viewpoint of improving the productivity of pellets, the melt flow rate is preferably not more than 10 g/10 min, more preferably not more than 4 g/10 min. The melt flow rate is a value measured by Method A under conditions represented by a temperature of 190° C. and a load of 21.18 N in the method provided in JIS K7210-1995.

The melt flow rate of an ethylene-based polymer can be increased by promoting chain transfer that involves the transfer of the polymerizing site of a molecule to another molecule during polymerization by increasing chain transferability during the production of the polymer. Specific examples of means for increasing the chain transferability include increasing the concentration of a chain transfer agent and increasing the polymerization temperature. As the chain transfer agent, hydrogen, ethane, propane, and so on are used.

The ethylene-based polymer to be used for the present invention is preferably one being low in kneading torque (this may hereinafter be referred to as "B torque" (unit: Nm)).

One being low in kneading torque (this may hereinafter be referred to as "B torque" (unit: Nm)) and high in melt tension at 190° C. (this may hereinafter be referred to as "MT190" (cN)) is more preferred.

The kneading torque of the ethylene-based polymer to be used for the present invention is 2 to 15 Nm. Within this range, the degree of crosslinking can be increased.

From the viewpoint of reducing the extrusion load at molding, the kneading torque is preferably not more than 14 Nm, more preferably not more than 13 Nm. From the viewpoint of increasing the mechanical strength of molded articles, it is preferably not less than 5 Nm, more preferably not less than 9 Nm.

The ethylene-based polymer used by the present invention preferably has an easy-processability index (this may hereinafter be referred to as "EP index"), obtained by dividing MT190 by B torque as represented by Formula (1), is preferably 0.1 to 1.

$$(\text{EP index}) = (MT190)/(B \text{ torque}) \qquad \text{Formula (1)}$$

From the viewpoint of reducing the extrusion load at molding and increasing the degree of crosslinking, the EP index is more preferably not less than 0.3, even more preferably not less than 0.4, and most preferably not less than 0.5. From the viewpoint of improving the spreadability at extrusion process, the EP index is preferably not more than 0.9, more preferably not more than 0.8, and most preferably not more than 0.7.

The melt tension of an ethylene-based polymer is defined by a maximum tension (unit: cN) detected between the commencement of drawing a strand-like ethylene-α-olefin copolymer and the occurrence of the breakage thereof in the measurement of a tension applied to an extruded molten ethylene-α-olefin copolymer being drawn into a strand form at a drawing-up rate of 6.3 (m/min), the molten ethylene-α-olefin copolymer having been extruded at a temperature of 190° C. and an extrusion rate of 0.32 g/min through an orifice of 2.095 mm in diameter and 8 mm in length.

The melt tension of an ethylene-based polymer can be altered depending upon, for example, the pressure of ethylene during polymerization or the polymerization temperature, and the melt tension can be increased by reducing the pressure of ethylene during polymerization or increasing the polymerization temperature.

The kneading torque of the ethylene-based polymer to be used for the present invention is a value of torque (unit: Nm) at 30 minutes from the commencement of kneading at a temperature of 160° C. and a rotation speed of 60 rpm using a Plasti-Corder manufactured by Brabender GmbH & Co. It is preferred to blend an antioxidant beforehand in an appropriate amount (e.g., 1000 ppm) into a sample to be measured.

The kneading torque can be altered by, for example, altering the retention time during polymerization; the kneading torque of an ethylene polymer can be reduced by increasing the retention time of ethylene during polymerization.

The ethylene-α-olefin copolymer to be used for the present invention has a long chain branch in addition to a short chain branch derived from an α-olefin and it is produced using a metallocene catalyst. Specific examples thereof include EXCELLEN GMH (Sumitomo Chemical Co., Ltd.) and SUMIKATHENE EP (Sumitomo Chemical Co., Ltd.); EXCELLEN GMH or SUMIKATHENE EP is preferred.

The ethylene-based polymer to be used for the present invention may be made to contain a conventional additive according to need. Examples of such an additive include antioxidants, weathering agents, lubricants, antiblocking agents, antistatic agents, anticlouding agents, antidripping agent, pigments, and fillers.

The ethylene-based polymer to be used for the present invention may be made to contain a conventional polyolefin according to need unless the effect of the present invention is impaired. Examples of such a conventional polyolefin include high density polyethylene, low density polyethylene, ultra low density polyethylene, very low density polyethylene, polypropylene, ethylene-vinyl acetate copolymers, ethylene-acrylic acid copolymers, ethylene-acrylic ester copolymers, ethylene-methacrylic acid copolymers, ethylene-methacrylic ester copolymers, and polyolefin rubbers.

As the method for producing the ethylene polymer pellet of the present invention, there can be used conventional methods, which generally include the strand cut method that involves extruding a molten ethylene-α-olefin copolymer into a strand form by using an extruder and cutting it with a cutter, the die cut method that involves extruding a molten ethylene-α-olefin copolymer through a die of an extruder and cutting it at the die face, and the sheet cut method that involves extruding a molten ethylene-α-olefin copolymer into a sheet form and cutting it into a pellet form. The die cut method includes the underwater cut method in which cutting is performed underwater and the hot cut method in which cutting is performed under cooling with cooling air or water. From the viewpoint of feeding and conveying ability of pellets in a single-screw extruder, the strand cut method or the die cut method is preferred, and the die cut method is more preferred.

In the strand cut method or the die cut method, the surface area, volume, and specific surface area of a pellet can be adjusted by adjusting the size of the outlet of a die, the throughput of a molten resin through a die, and the cutting speed of a cutter. Specifically, the larger the die outlet, the larger the surface area and the volume of the pellet are but the smaller the specific surface area is; the more the throughput is, the larger the surface area and the volume of the pellet are but the smaller the specific surface area is; and the slower the cutting speed of a cutter is, the larger the surface area and the volume of the pellet are but the smaller the specific surface area is.

In the sheet cut method, the surface area, volume, and specific surface area of a pellet can be adjusted through the choice of the thickness of a sheet and the size of cutting. Specifically, the surface area and volume of a pellet increase and the specific surface area thereof decreases as the thickness of a sheet increases, whereas the surface area and volume of a pellet decrease and the specific surface area thereof increases as a sheet is cut smaller and smaller.

The specific surface area of the pellet of the present invention is 1800 to 3000 $mm^2/g$. From the viewpoint of the productivity of a pellet, it is preferably not less than 2000 $mm^2/g$, more preferably not less than 2100 $mm^2/g$. From the viewpoint of improving extrudability in molding by using a single-screw extruder with the addition of a liquid, it is preferably not more than 2800 $mm^2/g$, more preferably not more than 2600 $mm^2/g$. The specific surface area of a pellet is calculated by dividing the surface area of the pellet by the weight of the pellet.

The surface area of the pellet of the present invention is preferably 20 to 60 $mm^2$. From the viewpoint of the productivity of the pellet, it is more preferably not less than 30 $mm^2$, even more preferably not less than 40 $mm^2$. From the viewpoint of improving extrudability in molding by using a single-screw extruder with the addition of a liquid, it is more preferably not more than 58 $mm^2$, even more preferably not more than 55 $mm^2$. The surface area of a pellet is determined by using an X-ray CT scanner described below.

The volume of the pellet of the present invention is preferably 10 to 30 $mm^3$. From the viewpoint of the productivity of the pellet, it is more preferably not less than 15 $mm^3$, even more preferably not less than 20 $mm^3$. From the viewpoint of improving extrudability in molding by using a single-screw extruder with the addition of a liquid, it is preferably not more than 28 $mm^3$, more preferably not more than 25 $mm^3$. The volume of a pellet is determined by using an X-ray CT scanner described below.

The shape of the pellet of the present invention may be, but is not particularly restricted to, a spherical shape, a spheroidal shape, a drug capsule shape, a cylindrical shape, a conical shape, a plate-like shape, etc.; from the viewpoint of improving the feeding and conveying ability of pellets by a screw in a single-screw extruder, the shape is preferably any one of a cylindrical shape, a spherical shape, and a spheroidal shape.

If the ethylene-α-olefin copolymer pellet of the present invention and a liquid are fed into a hopper, kneaded with a single-screw extruder, and extruded through a die, extrusion process can be performed stably.

The process that involves feeding the pellet of the present invention and a liquid into a hopper, kneading them in a single-screw extruder, and extruding them through a die is a method in which the ethylene-α-olefin copolymer pellet of the present invention and a liquid are fed into a hopper; while the pellet and the liquid are brought into contact with each other, they are introduced into a single-screw extruder, especially to the around the starting point of helix of the screw of the extruder through the hopper due to their own weight or mechanical action; the pellet is conveyed by the rotation of the screw while the pellet is heated; the copolymer is melted by the heat supplied from the extruder and by heat generation due to shear between the copolymer and the screw or cylinder and then it is kneaded with the liquid; and the resultant is extruded through a die part located at the tip of the extruder.

Generally, a single-screw extruder can convey a polymer to the tip of an extruder by its screw because the friction between the cylinder of the extruder and the polymer is greater than the friction between the screw and a pellet. However, if a conventional pellet and a liquid are added directly into the hopper, then the liquid enters into between the pellet and the cylinder in the extruder to reduce the friction between the cylinder and the pellet and to allow the pellet to slip, so that it becomes difficult to convey the pellet to the tip of the extruder.

Since the pellet of the present invention can adsorb, or accommodate a liquid during a period from its feed into a hopper to its complete melting, it hardly suffers from slip, which is a conventional problem, and it is expected that stable extrusion will be attained.

A method in which the pellet of the present invention and a liquid are mixed together and brought into contact with each other before being fed into a hopper and a method in which the pellet of the present invention and a liquid are mixed together in the hopper are suitable as the method of use of the pellet of the present invention because the adsorption, absorption and accommodation of the liquid into the pellet can be promoted.

The amount of the liquid to be added is usually 0.01 to 10 parts by weight relative to 100 parts by weight of the ethylene-α-olefin copolymer pellet.

Examples of the liquid to be used for the present invention include alkoxysilanes. The liquid to be used may be one in which various additives have been diluted with a solvent.

Alkoxysilanes are compounds in which an alkoxy group, such as a methoxy group, an ethoxy group, and a phenoxy group, is attached to silicon.

Specific examples of the alkoxysilanes include tetramethoxysilane, tetraethoxysilane, tetraphenoxysilane, methyltrimetoxysilane, methyltriethoxysilane, vinyltrimethoxysilane, vinyltriethoxysilane, vinyltriphenoxysilane, 3-methacryloxypropyltrimethoxysilane, 3-methacryloxypropyltriethoxysilane, 3-methacryloxypropylmethyldimethoxysilane, 3-methacryloxypropylmethyldiethoxysilane, 3-glycidoxypropyltrimethoxysilane, 3-glycidoxypropyltriethoxysilane, 3-glycidoxypropylmethyldimethoxysilane, 3-glycidoxypropylmethyldiethoxysilane, 3-acryloxypropyltrimethoxysilane, 3-acryloxypropyltriethoxysilane, 3-aminopropyltrimethoxysilane, 3-aminopropyltriethoxysilane, N-2-(aminoethyl)-3-aminopropyltrimethoxysilane, N-2-(aminoethyl)-3-aminopropyltrimethoxysilane, N-2-(aminoethyl)-3-aminopropylmethyldimethoxysilane, p-styryltrimethoxysilane, p-styryltriethoxysilane, N-phenyl-3-aminopropyltrimethoxysilane, N-phenyl-3-aminopropyltriethoxysilane, 3-triethoxysilyl-N-(1,3-dimethylbutylidene)propylamine, 2-(3,4-epoxycyclohexyl)ethyltrimethoxysilane, 3-isocyanatopropyltriethoxysilane, bis(triethoxysilylpropyl)tetrasulfide, 3-mercaptopropyltrimethoxysilane, 3-mercaptopropylmethyldimethoxysilane, and 3-chloropropyltrimethoxysilane. The alkoxysilane may be used singly or a plurality of alkoxysilanes may be used in combination.

The amount of the alkoxysilane to be added is preferably 0.01 to 10 parts by weight, more preferably not less than 0.1 parts by weight, and even more preferably not less than 0.5 parts by weight relative to 100 parts by weight of the ethylene-α-olefin copolymer pellet. From the viewpoint of improving extrudability in a single-screw extruder, it is more preferably not more than 5 parts by weight; even more preferably not more than 3 parts by weight.

The alkoxysilane is used for, e.g., improvement of materials in wettability, bonding inorganic or metallic components to organic components, crosslinking or bonding between organic components. In particular, it is preferably used for synthetic resins for the purposes of improving the ability to accept inorganic components and crosslinking resins together.

In the present invention, other additives may be used as a liquid after being mixed or dissolved in the alkoxysilane. Examples of such additives to be mixed or dissolved in the alkoxysilane include crosslinking aids to promote the crosslinking of the alkoxysilane, radical generators to be used for the graft of the alkoxysilane, and antioxidants to suppress the degradation of the alkoxysilane.

Examples of the crosslinking aid include tin tetraacetate, butyltin triacetate, butyltin tributyrate, butyltin trihexylate, butyltin trioctate, butyltin trilaurate, butyltin trimethylmalate, octyltin triacetate, octyltin tributyrate, octyltin trihexylate, octyltin trioctate, octyltin trilaurate, octyltin trimethylmalate, phenyltin tributyrate, phenyltin trilaurate, dibutyltin diacetate, dibutyltin dibutyrate, dibutyltin dihexylate, dibutyltin dioctate, dibutyltin dilaurate, dibutyltin diethylmalate, dioctyltin diacetate, dioctyltin dibutyrate, dioctyltin dihexylate, dioctyltin dioctate, dioctyltin dilaurate, dioctyltin diethylmalate, tributyltin acetate, tributyltin butyrate, tributyltin hexylate, tributyltin octate, tributyltin laurate, tributyltin methylmalate, trioctyltin acetate, trioctyltin butyrate, trioctyltin hexylate, trioctyltin octate, trioctyltin laurate, and trioctyltin methylmalate. As a crosslinking aid, dibutyltin dilaurate is preferred.

The amount of the crosslinking aid added is preferably 0.1 to 10 parts by weight relative to 100 parts by weight of the alkoxysilane. From the viewpoint of achieving good crosslinkability, it is preferably not less than 0.5 parts by weight, more preferably not less than 1 part by weight. From the viewpoint of suppressing excessive crosslinking caused by the crosslinking aid, it is preferably not more than 8 parts by weight, more preferably not more than 5 parts by weight.

Examples of a radical generator include di-tert-butyl peroxide, tert-butyl hydroperoxide, tert-butyl-peroxy-2-ethyl hexanate, dicumyl peroxide, tert-butylperoxyisopropyl carbonate, tert-butyl peroxybenzoate, di-tert-amyl peroxide, cumyl hydroperoxide, tert-butylperoxypivalate, 2,2'-azobis(2,4-dimethylvaleronitrile), 2,2'-azobis(4-methoxy-2,4-dimethylvaleronitrile), dimethyl 2,2'-azobis(2-methylpropionate), and 2,2'-azobis(2-methylbutyronitrile). As a radical generator, dicumyl peroxide is preferred.

The amount of the radical generator added is preferably 1 to 100 parts by weight relative to 100 parts by weight of the alkoxysilane. From the viewpoint of improving the graftability of the alkoxysilane, it is preferably not less than 4 parts by weight, more preferably not less than 8 parts by weight. From the viewpoint of suppressing the crosslinking of the ethylene-α-olefin copolymer caused by the radical generator, it is more preferably not more than 40 parts by weight, even more preferably not more than 20 parts by weight.

Examples of an antioxidant include phenol-based antioxidants, phosphorus-containing antioxidants, and sulfur-containing antioxidants.

Examples of the phenolic antioxidants include 2,6-di-tert-butyl-4-methylphenol (BHT), n-octadecyl-3-(3,5-di-tert-butyl-4-hydroxyphenyl)propionate (commercial name: Irganox 1076, produced by Ciba Specialty Chemicals), pentaerythrityl-tetrakis[3-(3,5-di-tert-butyl-4-hydroxyphenyl)propionate] (commercial name: Irganox 1010, produced by Ciba Specialty Chemicals), 1,3,5-tris(3,5-di-tert-butyl-4-hydroxybenzyl)isocyanurate (commercial name: Irganox 3114, produced by Ciba Specialty Chemicals), 1,3,5-trimethyl-2,4,6-tris(3,5-di-tert-butyl-4-hydroxybenzyl)benzene, and 3,9-bis[2-{3-(3-tert-butyl-4-hydroxy-5-methylphenyl)propionyloxy}-1,1-dimethylethyl]-2,4,8,10-tetraoxaspiro [5.5]undecane) (commercial name: Sumilizer GA80, produced by Sumitomo Chemical Co., Ltd.).

Examples of the phosphorus-containing antioxidants include distearyl pentaerythritol diphosphite (commercial name: ADK STAB PEP8), tris(2,4-di-tert-butylphenyl)phosphite (commercial name: Irgafos 168, produced by Ciba Specialty Chemicals), bis(2,4-di-tert-butylphenyl)pentaerythritol diphosphite, tetrakis(2,4-di-tert-butylphenyl) 4,4'-biphenylenediphosphonite (commercial name Sandostab P-EPQ, produced by Clariant(Japan) K.K.), and bis(2-tert-butyl-4-methylphenyl)pentaerythritol diphosphite.

Examples of antioxidants having both a phenol structure and a phosphoric acid structure include 6-[3-(3-tert-butyl-4-hydroxy-5-methylphenyl)propoxy]-2,4,8,10-tetra-tert-butyldibenz[d,f][1,3,2]-dioxaphosphepin (commercial name: Sumilizer GP, produced by Sumitomo Chemical Co., Ltd.).

Examples of the sulfur-containing antioxidants include 4,4'-thiobis(3-methyl-6-tert-butylphenol) (commercial name: Sumilizer WXR, produced by Sumitomo Chemical Co., Ltd.), and 2,2-thiobis-(4-methyl-6-tert-butylphenol) (commercial name: IRGANOX 1081, produced by Ciba Specialty Chemicals).

The amount of the antioxidant added is preferably 0.1 to 10 parts by weight relative to 100 parts by weight of the alkoxysilane.

Preferably, the liquid to be used for the present invention contains vinyltrimethoxysilane and dicumyl peroxide. By extruding an ethylene-α-olefin copolymer stably using such a liquid, it is possible to obtain molded articles grafted with vinyltrimethoxysilane. A molded article grafted with vinyltrimethoxysilane undergoes the hydrolysis of a methoxy group, forming silanol and as a result turning into a molded article that is crosslinkable through a silanol dehydration condensation reaction that will occur succeedingly.

Additives are used by being mixed and dissolved in an alkoxysilane in advance. Among additives such as crosslinking aids and radical generators, liquid one may be added to a hopper separately from the alkoxysilane.

Even in the event that a liquid other than alkoxysilanes is used, the pellet of the present invention affords extrudability as good as with alkoxysilanes. The liquid to be used for the present invention may be any one that is liquid at the time of being added to a pellet and it also includes one that can be added in a liquid state to a pellet even if it is solid at ambient temperature.

The type of the liquid other than alkoxysilanes is not particularly restricted as far as it can be used by being added to a resin; specific examples thereof include oils, surfactants, anti-fogging agents, antistatic agents, lubricants, antioxidants, crosslinking agents, crosslinking aids, weathering agents, perfumes, and plasticizers.

The extrusion process to be performed by the use of a single-screw extruder using the pellet of the present invention is not restricted as far as it is a conventional process to be applied to ethylene-α-olefin copolymers; specific examples thereof include extrusion granulation, blown film process, flat die film process, process for forming pipe or tube, process for coating wire, process for coating metal tube, blow molding, and compression molding.

Formed articles to be obtained by the aforementioned processes include extruded strands, pellets, films, sheets, bottles, electric wires and cables, pipes, heat-resistant or chemical-resistant tubes, coated metal pipes, containers, bottles, tanks, and electric-mechanical components. In particular, formed articles are used suitably for pellets, electric cables, pipes, and heat-resistant or chemical-resistant tubes.

Like conventional pellets, the pellet of the present invention may be used for various conventional processes without use of liquid in combination.

EXAMPLES

The present invention is explained by reference to Examples and Comparative Examples below.

Physical properties in Examples and Comparative Examples were measured in accordance with the following methods.

(1) The densities ($d_A$, unit: kg/m$^3$) of ethylene homopolymers and ethylene-α-olefin copolymers were measured in accordance with Method A provided in JIS K7112-1980. Samples were subjected to the annealing disclosed in JIS K6760-1995.

(2) Densities ($d_B$, unit: kg/m$^3$) of ethylene-vinyl acetate copolymers, ethylene-acrylic acid copolymers, ethylene-acrylic ester copolymers, ethylene-methacrylic acid copolymers, ethylene-methacrylic esters, ethylene-conjugated diene copolymers, and ethylene-nonconjugated diene copolymers The densities ($d_B$, unit: kg/m$^3$) of ethylene-vinyl acetate copolymers, ethylene-acrylic acid copolymers, ethylene-acrylic ester copolymers, ethylene-methacrylic acid copolymers, and ethylene-methacrylic esters were measured in accordance with Method A provided in JIS K7112-1980.

(3) Melt Flow Rate (MFR; Unit: g/10 min)

Measurement was conducted by Method A under conditions represented by a load of 21.18 N and a temperature of 190° C. in accordance with the method provided in JIS K7210-1995.

(4) Kneading Torque (B Torque, Unit: Nm)

A roller mixer type 50 (with a volume of 60 ml) was mounted to a Brabender Plasti-Corder type PLV-151 manufactured by Brabender GmbH & Co., then a mixture prepared by adding 1000 ppm of SUMILIZER WXR (produced by Sumitomo Chemical Co., Ltd.) as an antioxidant to 40 g of a sample was kneaded under conditions represented by a mixer preset temperature of 160° C. and a rotation speed of 60 rpm, and then a torque value was measured 30 minutes later. It is indicated that the smaller this value is, the lower the kneading load is and the better the moldability is.

(5) Melt Tension (MT190, Unit: cN)

Using a melt tension tester manufactured by Toyo Seiki Seisaku-sho, Ltd., an ethylene-α-olefin copolymer was melt extruded through an orifice of 2.095 mm in diameter and 8 mm in length at a temperature of 190° C. and an extrusion rate of 0.32 g/min. The extruded molten ethylene-α-olefin copolymer was taken up into a filament form with a take-up roll at a take-up rate of 6.3 (m/min), and then the tension applied during the take-up was measured. The maximum tension during a period from the commencement of take-up to the breakage of the filament-shaped ethylene-α-olefin copolymer was defined as melt tension. The larger this value is, the better the shapability of an extruded molten material at sizing during extrusion is and the better the moldability is.

(6) Surface Area and Volume of Pellet (Surface Area in the Unit of [mm$^2$], Volume in the Unit of [mm$^3$])

The surface area and the volume of pellets were measured under the following conditions by using an X-ray CT scanner.

Instrument:
X-ray CT scanner TDM1000-IS/SP (manufactured by YAMATO SCIENTIFIC CO., LTD.)

Measurement Conditions:
(i) Tube current: 30 kV
(ii) Tube voltage: 35 μA
(iii) Number of pixels: 512×512 pixels
(iv) Size of visual field: 5.9 mmϕ×5.9 mmh Analysis Software:
VG Studio MAX (produced by Nihon Visual Science, Inc.)

(7) Specific Surface Area of Pellet (Unit: [mm$^2$/g])

Using a pellet whose surface area and volume had been measured, the pellet was weighed and then its specific surface area (surface area per unit weight) was calculated.

(8) Evaluation of Extrudability

By the use of a 30-mm single-screw extruder designed so that a liquid could be dropped with a pump for high-speed liquid chromatography (LC-6A manufactured by Shimadzu Corporation) or a syringe pump (SP-2PC manufactured by As One) into a hopper into which a resin was to be fed, a pellet and a liquid were fed into the hopper, kneaded in the single-screw extruder, and then extruded through a die. The pellet and the liquid were not positively mixed within the hopper, and the pellet and an additive were allowed to drop spontaneously from the hopper and introduced into the extruder.

As the liquid, one prepared by dissolving 10 parts by weight of dicumyl peroxide in 100 parts by weight of vinyltrimethoxysilane was used.

The temperature of the cylinder of the extruder was set at 170° C., 190° C., and 210° C. in order from the hopper side and the temperature of the die was set at 210° C.

The rotation speed of the screw of the extruder was adjusted so that the throughput of the resin would be 2.4 kg/hr when the liquid was not added, and the rotation speed of the extruder was not altered after the commencement of the addition of the liquid.

The drop of the liquid was started at a pump flow rate of 0.4 ml/min, and then whether extrusion was being continued smoothly or not was checked with that flow rate being kept for at least 20 minutes. If there was no problem with the extrusion, then the flow rate was increased by 0.2 ml/min and the extrudability was checked again with the resulting flow rate being kept for at least 20 minutes; the increase of 0.2 ml/min in flow rate and the check of the condition for 20 minutes were repeated until it became impossible to carry out extrusion due to the slip of the copolymer, and the evaluation was done until the flow rate reached 1.2 ml/min. On the basis of the flow rate of the liquid applied before it became impossible to carry out the extrusion due to the slip of the copolymer on the screw, the extrudability was evaluated. The larger the flow rate of the liquid is, the better the extrudability is.

(9) Degree of Crosslinking (Unit: %)

An extrudate obtained during the above-described evaluation of extrudability was wrapped with bleached cloth, and stored for 7 days within a sample chamber kept at a constant temperature and a constant humidity, i.e., a temperature of 23° C. and a humidity of 50%, and then the degree of crosslinking was measured in the following procedures.

Into a bag produced by using a stainless steel wire net of 100 meshes, sample g was added and the total weight was measured. The stainless steel bag containing the sample was immersed in xylene of 110° C. for 2 hours. The stainless steel bag was taken out and the weight of the bag containing the sample was measured. The degree of crosslinking was calculated from the following formula.

Degree of crosslinking (%)=(Weight of the sample and the bag after immersion in xylene)÷(Weight of the sample and the bag after immersion in xylene)×100(%)

The higher the degree of crosslinking is, the better the crosslinkability is.

Example 1

(1) Preparation of Pellet

Using SUMIKATHENE EP CU5003 (produced by Sumitomo Chemical Co., Ltd.; ethylene-1-butene-1-hexene copolymer; MFR=0.5 [g/10 min], density=928 [kg/m$^3$], B torque=12.7 [Nm], MT=190 7.7 [cN], EP index=0.6), extrusion was carried out by the use of an extruder with die cutting equipment having a die hole diameter of 3.2 mm, at a throughput per die hole of 71.8 [g/min], and then cutting was carried out at a cutting speed of the cutter of die cut of 0.014 [sec/cut], so that pellet A was obtained. The physical properties of the pellet A are given in Table 1.

(2) Extrusion Process

Using the pellet A prepared above, the evaluation of extrudability was carried out by the above-described method while dropping a liquid (100 parts by weight of vinyltrimethoxysilane, 10 parts by weight of dicumyl peroxide) at a throughput of 40 g/min at 210° C. by using a 30-mm extruder.

The pellet A was extruded successfully without any problems even at the amount of the liquid added of 1.2 [ml/min].

(3) Physical Property of Extrudate

In the above-described evaluation of extrudability, the extrudate obtained at the liquid addition of 1.2 [ml/min] had a degree of crosslinking of 63%.

Comparative Example 1

(1) Preparation of Pellet

Pellet B was obtained in the same manner as Example 1 except that the throughput per die hole was adjusted to 85.8 [g/min] and the cutting speed of the cutter was adjusted to 0.023 [sec/cut]. The physical properties of the pellet B are given in Table 1.

(2) Extrusion Process

Using the pellet B produced above, the evaluation of extrudability was performed with a 30-mm extruder while dropping a liquid (100 parts by weight of vinyltrimethoxysilane and 10 parts by weight of dicumyl peroxide) in the same manner as Example 1.

At the amount of the liquid added of 0.6 [ml/min], the pellet B became impossible to be extruded.

(3) Physical Property of Extrudate

In the above-described evaluation of extrudability, the extrudate obtained at the liquid addition of 0.4 [ml/min] had a degree of crosslinking of 21%.

TABLE 1

| Physical property | Unit | Pellet A | Pellet B |
|---|---|---|---|
| Surface area | mm$^2$ | 54 | 65 |
| Volume | mm$^2$ | 22 | 36 |
| Specific surface area | mm$^2$/g | 2237 | 1673 |

Example 2

Using the pellet A produced in Example 1, the evaluation of extrudability was performed with a 30-mm extruder while dropping a liquid (100 parts by weight of vinyltrimethoxysilane, 10 parts by weight of dicumyl peroxide, and 4 parts by weight of dibutyltin dilaurate) in the same manner as Example 1.

The pellet A was extruded successfully without any problems even at the amount of the liquid added of 0.8 [ml/min].

(3) Physical Property of Extrudate

In the above-described evaluation of extrudability, the extrudate obtained at the liquid addition of 0.8 [ml/min] had a degree of crosslinking of 91%.

Example 3

(1) Preparation of Pellet

Pellet C was obtained in the same manner as Example 1 except that the die diameter was adjusted to 2.5 mm, the throughput per die hole was adjusted to 104.9 [g/min] and the cutting speed of the cutter of die cut was adjusted to 0.024 [sec/cut]. The physical properties of the pellet C are given in Table 1.

(2) Extrusion Process

Using the pellet C produced above, the evaluation of extrudability was performed with a 30-mm extruder while dropping a liquid (100 parts by weight of vinyltrimethoxysilane and 10 parts by weight of dicumyl peroxide) in the same manner as Example 1.

The pellet C was extruded successfully without any problems even at the amount of the liquid added of 1.2 [ml/min].

(3) Physical Property of Extrudate

In the above-described evaluation of extrudability, the extrudate obtained at the liquid addition of 1.2 [ml/min] had a degree of crosslinking of 61%.

Comparative Example 2

(1) Preparation of Pellet

Using SUMIKATHENE E FV205 (produced by Sumitomo Chemical Co., Ltd.; ethylene-1-hexene copolymer; MFR=2 [g/10 min], density=921 [kg/m$^3$], B torque=21 [Nm], MT190=0.6 [cN], EP index=0.03), extrusion of strands was carried out by the use of an extruder equipped with a two-hole die for strands, each of the holes being 4 mm in diameter, and the resulting strands were led, via a cooling water bath, to a strand cutter with 14 blades and taken up at a rate of 7 m/min and cut, affording pellet D. The physical properties of the pellet D are given in Table 2.

(2) Extrusion Process

Using the pellet D produced above, the evaluation of extrudability was performed with a 30-mm extruder while dropping a liquid (100 parts by weight of vinyltrimethoxysilane and 10 parts by weight of dicumyl peroxide) in the same manner as Example 1.

At the amount of the liquid added of 0.4 [ml/min], the pellet D became impossible to be extruded.

(3) Physical Property of Extrudate

In the above-described evaluation of extrudability, the extrudate obtained at the liquid addition of 0.4 [ml/min] had a degree of crosslinking of 31%.

TABLE 2

| Physical property | Unit | Pellet C | Pellet D |
|---|---|---|---|
| Surface area | mm$^2$ | 50 | 50 |
| Volume | mm$^2$ | 24 | 20 |
| Specific surface area | mm$^2$/g | 1931 | 2303 |

INDUSTRIAL APPLICABILITY

By the present invention, it is possible to provide an ethylene-based polymer pellet that can be extruded stably by using a single screw extruder while adding a liquid directly to the pellet without adding the liquid to molten resin by using a feeder, a pump, or the like.

The invention claimed is:

1. A process for preparing an extruded product comprising
    (a)(1) feeding a pellet of an ethylene α-olefin copolymer and a liquid into a hopper to a single screw extruder, and mixing the pellet and the liquid together in the hopper, wherein the ethylene-α-olefin copolymer exhibits a kneading torque of 2 to 15 Nm at 160° C. and the pellet has a specific surface area of 1800 to 3000 mm$^2$/g, or
    (a)(2) mixing a pellet of an ethylene-α-olefin copolymer and a liquid together and bringing them into contact with each other before feeding them into a hopper of a single screw extruder, and then feeding them into the hopper to a single screw extruder, wherein the ethylene-α-olefin copolymer exhibits a kneading torque of 2 to 15 Nm at 160° C. and the pellet has a specific surface area of 1800 to 3000 mm$^2$/g;
    (b) kneading them in the single-screw extruder to form a kneaded material; and
    (c) extruding the kneaded material through a die to obtain the extruded product.

2. The process according to claim 1, wherein the liquid is an alkoxysilane.

3. The process according to claim 1, wherein the liquid comprises an alkoxysilane and a radical generator.

4. The process according to claim 2, wherein the alkoxysilane is vinyltrimethoxysilane.

5. The process according to claim 3, wherein the radical generator is dicumyl peroxide.

6. The process according to claim 1, wherein the ethylene-α-olefin copolymer has an EP index of 0.1 to 1 calculated by the following method:

$$\text{EP index} = (MT\,190)/(B\text{ torque}),$$

wherein
  MT190 (unit cN) is a melt tension at 190° C., and
  B torque (unit: Nm) is a kneading torque at 160° C.

7. The process according to claim 6, wherein the EP index is not less than 0.3.

8. The process according to claim 6, wherein the EP index is not less than 0.4.

9. The process according to claim 6, wherein the EP index is (a) not less than 0.5; (b) not more than 0.7, (c) not more than 0.8; or (d) not more than 0.9.

10. The process according to claim 1, wherein the pellet has a specific surface area of 1800 to 2800 mm$^2$/g.

11. The process according to claim 1, wherein the pellet has a specific surface area of 1800 to 2600 mm$^2$/g.

12. The process according to claim 1, wherein the pellet has a specific surface area of (a) 2237 mm$^2$/g; or (b) a specific surface area of 2237 to 2303 mm$^2$/g.

13. The process according to claim 1, wherein the pellet has a surface area of 20 to 60 mm$^2$.

14. The process according to claim 13, wherein the pellet has a surface area of (a) not less than 30 mm$^2$; or (b) not less than 40 mm$^2$.

15. The process according to claim 14, wherein the pellet has a surface area of not more than 58 mm$^2$.

16. The process according to claim 6, wherein the at least one pellet has a surface area of 20 to 60 mm$^2$; the amount of the liquid is 0.01 to 10 parts by weight relative to 100 parts by weight of the pellet; and the liquid comprises an alkoxysilane and, optionally, a radical generator.

17. The process according to claim 1, wherein said process is conducted with (a)(1) feeding a pellet of an ethylene-α-olefin copolymer and a liquid into a hopper to a single screw extruder, and mixing the pellet and the liquid together in the hopper, wherein the ethylene-α-olefin copolymer exhibits a kneading torque of 2 to 15 Nm at 160° C. and the pellet has a specific surface area of 1800 to 3000 mm$^2$/g.

18. The process according to claim 1, wherein said process is conducted with (a)(2) mixing a pellet of an ethylene-α-olefin copolymer and a liquid together and bringing them into contact with each other before feeding them into a hopper of a single screw extruder, and then feeding them into the hopper to a single screw extruder, wherein the ethylene-α-olefin copolymer exhibits a kneading torque of 2 to 15 Nm at 160° C. and the pellet has a specific surface area of 1800 to 3000 mm$^2$/g.

19. The process according to claim 1, wherein the ethylene-α-olefin copolymer has a density of 860 kg/m$^3$ to 990 kg/m$^3$.

20. The process according to claim 1, wherein the ethylene-α-olefin copolymer has a melt flow rate of 0.01 g/10 min. to 100 g/10 min. measured at a temperature of 190° C. and a load of 21.18 N.

21. The process according to claim 1, wherein the ethylene-α-olefin copolymer has a long chain branch and a short chain branch derived from an α-olefin.

* * * * *